United States Patent [19]

Schweizer

[11] 4,455,927
[45] Jun. 26, 1984

[54] HEAT ACCUMULATING HOT PLATE FOR THE PREPARATION AND COOKING OF FOOD

[76] Inventor: Riccardo Schweizer, Via Roma, 41, Mezzano di Primiero (Province of Trento), Italy

[21] Appl. No.: 404,077

[22] Filed: Aug. 2, 1982

Related U.S. Application Data

[63] Continuation of Ser. No. 137,056, Apr. 3, 1980, abandoned.

[30] Foreign Application Priority Data

Apr. 6, 1979 [IT] Italy .................... 30679 A/79

[51] Int. Cl.³ .................................................. A47J 37/10
[52] U.S. Cl. ............................... 99/425; 99/446; 99/447; 126/375; 126/400; 426/523
[58] Field of Search .............. 99/422, 425, 446, 447; 126/375, 273.5, 380, 381, 400; 426/523

[56] References Cited

U.S. PATENT DOCUMENTS

| | | | |
|---|---|---|---|
| 929,388 | 7/1909 | Clement | 126/375 X |
| 2,229,518 | 1/1941 | Parker | 99/425 |
| 2,245,220 | 6/1941 | Nelson | 99/421 H |
| 3,019,783 | 2/1962 | Clarke | 126/37 S |
| 3,802,330 | 4/1974 | Graziani | 99/419 |
| 4,086,907 | 5/1978 | Rothschild | 126/375 X |

*Primary Examiner*—Billy J. Wilhite
*Attorney, Agent, or Firm*—Guido Modiano; Albert Josif

[57] ABSTRACT

Heat accumulating hot plate for the preparation and cooking of food, comprising a slab element formed from a stone of isotropic crystallographic structure and having a high thermal capacity. The slab is supported by a metal structure effective to keep it cleared from a wooden support. Between the slab and the wooden support there being interposed a drip pan for collecting any liquid matter released during the cooking process.

1 Claim, 5 Drawing Figures

HEAT ACCUMULATING HOT PLATE FOR THE PREPARATION AND COOKING OF FOOD

This is a continuation of application Ser. No. 137,056, filed Apr. 3, 1980, now abandoned.

BACKGROUND OF THE INVENTION

This invention relates to a heat accumulating hot plate for the preparation and cooking of food.

SUMMARY OF THE INVENTION

This invention sets out to provide a hot plate which is suitable for preparing and cooking food thereon without its use involving direct connection to a continuous supply energy source.

Within that general aim, it is an object of this invention to provide a hot plate as indicated, which is of compact size and can be utilized directly on the table for each commensal to cook food thereon.

Another object of the invention is to provide a hot plate as indicated, which is capable of retaining a temperature level suitable for cooking purposes over a convenient time lapse, following pre-heating thereof.

A further object is to provide a supporting structure for said plate, which can be used to prevent the table top from being deteriorated by the plate heat.

These and other objects, such as will be apparent hereinafter, are achieved by a heat accumulating hot plate for the preparation and cooking of food, characterized in that it comprises a parallelepipedal element formed from a stone of isotropic crystallographic structure and having a high thermal capacity, said parallelepipedon being supported by a metal structure effective to keep it raised off a wooden support, between said parallelepipedon and said wooden support there being interposed a drip pan for collecting any liquid matter released during the cooking process.

BRIEF DESCRIPTION OF THE DRAWINGS

Further features and advantages of the invention will be more clearly apparent from the detailed description of preferred, though not restrictive, embodiments thereof, as illustrated by way of example in the accompanying drawings, where.

DESCRIPTION OF THE PREFERRED EMBODIMENTS

Figure 1:
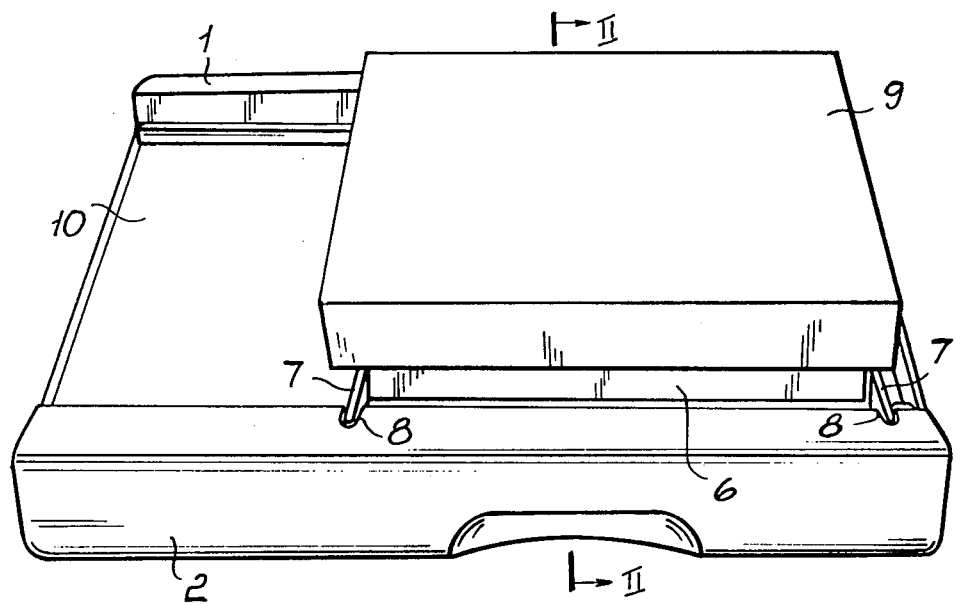
FIG. 1 shows in perspective the invention as having a direct cooking hot plate.
Figure 3:
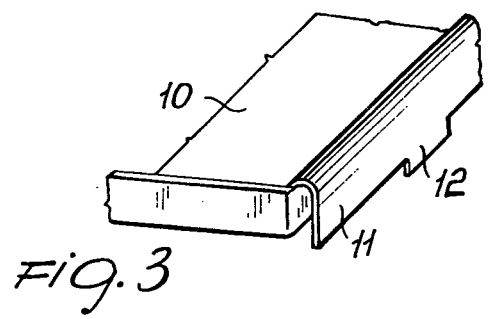
FIG. 3 is a detail view of the drip pan.

With reference to the cited figures, the invention comprises two shaped blocks of wood 1 and 2, which are identical and symmetrical, being connected together by a wooden deck 3 of substantially rectangular shape.

Said two blocks 1 and 2 support a small metal frame 4 comprising two pairs of metal angle brackets, respectively 5 and 6, which are welded to form a square with four protruding lugs 7 which fit in as many seats or sockets 8 formed in the top inner corner edge of said blocks.

Said metal frame 4 supports a plate or slab 9 of stone—preferably of serpentine or shale—and having a parallelepipedal shape with a lower peripheral undercut bevel adapted to fit in the space left free by the frame 4.

Between said frame 4 and said wooden deck 3, there is interposed a stainless steel drip pan 10 formed by folding a metal sheet to produce a pan.

The long sides of said drip pan 10 have two wings 11, folded downwards, which constitute resting contact lines with the wooden deck 3.

At an intermediate position, said wings 11 have a protruding tooth 12 which fits into two seats 13 formed in the deck 3, which permits the drip pan 10 to be positioned and held stationary.

The utilization procedure of this embodiment of the invention is the following: after heating the plate 9 for a suitable time in an oven or on any suitable heat source, the plate 9 is placed onto its frame and put on the table where meals are served.

Figure 2:
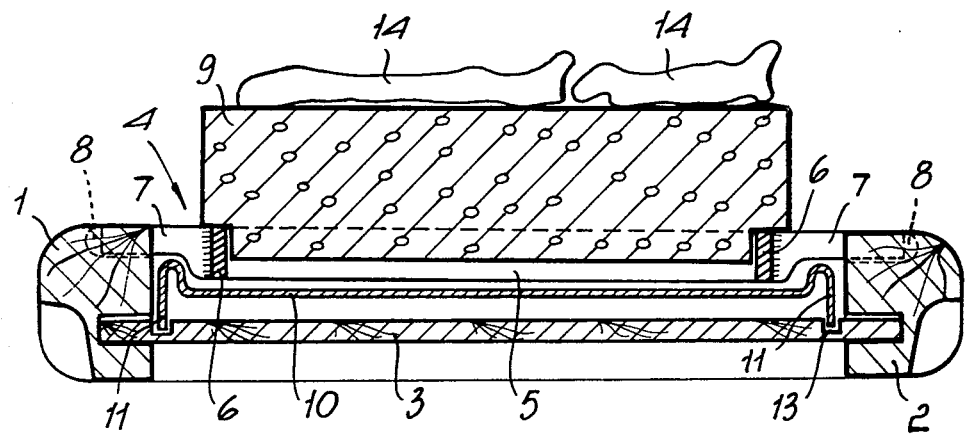
FIG. 2 is a sectional view taken along the line II—II of FIG. 1.

The heat is retained over a long time period, and food, as indicated at 14 in FIG. 2, can be cooked by placing it on the plate 9 and preparing it on that portion of the drip pan 10 which projects beyond the outline of the plate 9.

The hot plate, formed from serpentine or shale, can be heated to a high temperature without any risk of its breaking by non-isotropic expansion.

Figure 4:
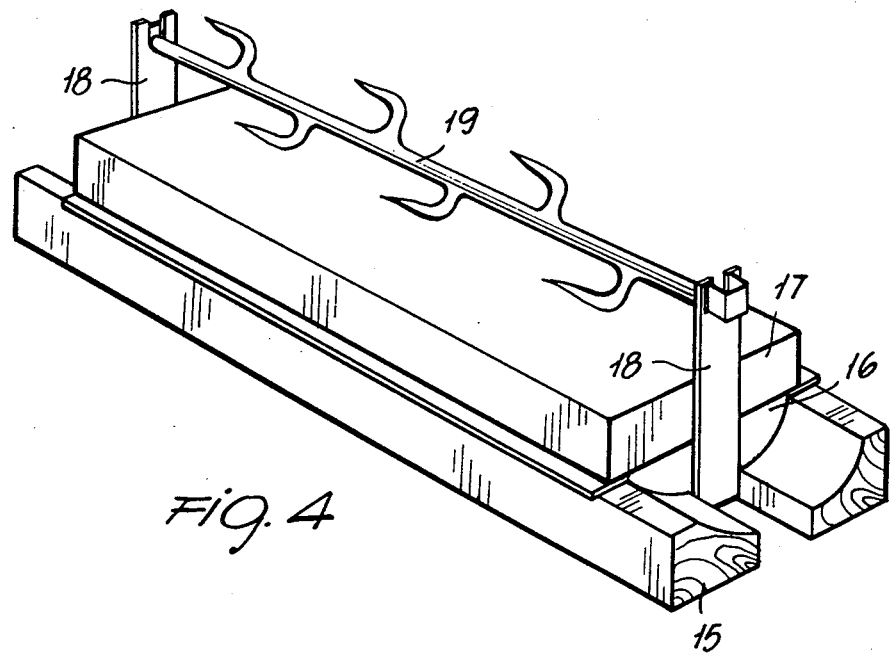
FIG. 4 illustrates a variations including a stand for a spit, in perspective.
Figure 5:
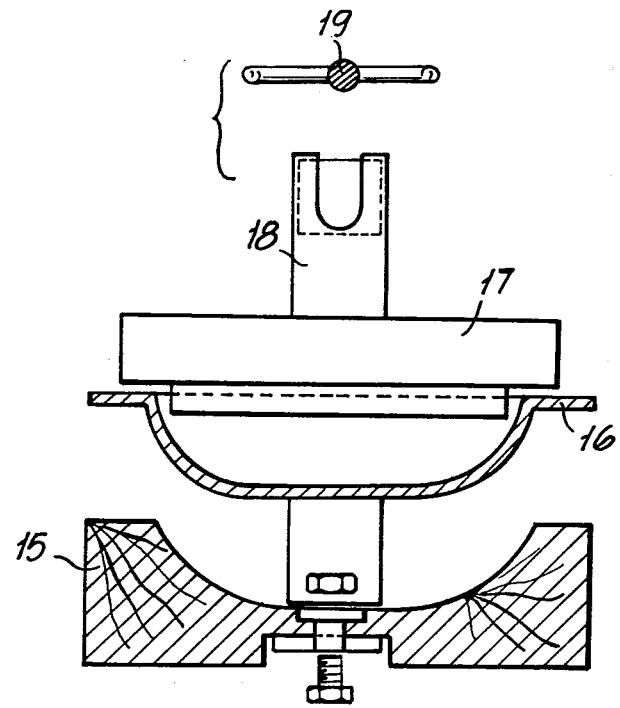
FIG. 5 is a sectional view taken along the line V—V of FIG. 4, showing the component parts disassembled.

A similar variation is shown in FIGS. 4 and 5: a wooden stand 15 supports a drip pan 16 which, in turn, supports a stone plate 17. In this embodiment, the shape—in plan view—is that of an elongated rectangle, and at the two ends thereof, the wooden stand 15 includes two vertical angle brackets 18 which terminate at the top in a fork and support a metal spit 19.

In this instance, the roast are prepared separately until fully cooked, thereafter the plate 17 is heated. Then, the dish is served after placing a spit 19 with the roast thereon onto the brackets 18, the dish being kept hot by the radiated heat of the plate.

Obviously, the dimensions and materials may be selected at will to suit individual requirements.

I claim:

1. A plate or dish arrangement for cooking and serving food, comprising in combination:
    (a) a wooden support of substantially rectangular shape having two parallel support side blocks with a lower resting surface and a board member fixed between said support side blocks parallel thereto in a position vertically distant from said lower resting surface;
    (b) a metal frame having bracket formations supported on said side blocks of said wooden support to maintain said metal frame spaced from said board member to define an interspace therebetween;
    (c) a slab element of substantially parallelepipedal configuration removably arranged on said metal frame such as to project upwards therefrom, the upper surface of said slab element constituting a cooking surface upon which food is to be directly laid, said slab element being formed from a stone having an isotropic crystallographic structure and high thermal capacity, said slab element being adapted to be heated in an oven before being placed for use upon said frame and
    (d) a drip pan partially arranged in said interspace between said slab element and said board member, said drip pan having side wings bent for resting on said board member to maintain said pan in spaced relationship from said board member and from said slab element and the area of said pan being greater than the area of said slab element to define a tray extending laterally beyond said slab element and said interspace whereby liquids released from the food can fall from the cooking surface onto the drip pan.

* * * * *